United States Patent
Chambers et al.

(10) Patent No.: US 11,989,110 B2
(45) Date of Patent: May 21, 2024

(54) GUIDANCE SYSTEM FOR COMPUTER REPAIR

(71) Applicant: Dell Products, L.P., Round Rock, TX (US)

(72) Inventors: Landon Martin Chambers, Round Rock, TX (US); Ravi Shukla, Bangalore (IN); Jeffrey Scott Vah, Round Rock, TX (US); Yi-Wun Chen, Tempe, AZ (US)

(73) Assignee: DELL PRODUCTS L.P., Round Rock, TX (US)

( * ) Notice: Subject to any disclaimer, the term of this patent is extended or adjusted under 35 U.S.C. 154(b) by 84 days.

(21) Appl. No.: 17/484,700

(22) Filed: Sep. 24, 2021

(65) Prior Publication Data

US 2023/0096271 A1    Mar. 30, 2023

(51) Int. Cl.
| | | |
|---|---|---|
| G06F 11/00 | (2006.01) | |
| G06F 11/07 | (2006.01) | |
| G06F 11/32 | (2006.01) | |
| G06F 18/21 | (2023.01) | |

(52) U.S. Cl.
CPC ........ G06F 11/321 (2013.01); G06F 11/0793 (2013.01); G06F 18/217 (2023.01)

(58) Field of Classification Search
CPC ............................ G06F 11/321; G06F 11/0793
USPC ...................................................... 714/1–57
See application file for complete search history.

(56) References Cited

U.S. PATENT DOCUMENTS

| | | | | |
|---|---|---|---|---|
| 6,526,529 | B1 * | 2/2003 | Miksovsky | G06F 11/327 714/E11.187 |
| 7,408,441 | B2 * | 8/2008 | Korzeniowski | H04L 41/0631 340/506 |
| 10,705,903 | B2 | 7/2020 | Majumder et al. | |
| 11,294,755 | B2 | 4/2022 | Vah et al. | |
| 2002/0077778 | A1 * | 6/2002 | Cobble | G06F 11/2257 702/182 |
| 2004/0260595 | A1 * | 12/2004 | Chessell | G06Q 10/06 714/47.2 |
| 2007/0168753 | A1 * | 7/2007 | Herter | G06F 11/079 714/E11.027 |
| 2012/0173925 | A1 * | 7/2012 | Lahdensivu | G06F 11/1453 714/15 |
| 2013/0007511 | A1 * | 1/2013 | Gaertner | G06F 11/1092 714/6.22 |
| 2016/0098312 | A1 * | 4/2016 | Kozawa | G06F 11/0787 714/37 |
| 2016/0147605 | A1 * | 5/2016 | Chen | G06F 11/1417 714/15 |

(Continued)

*Primary Examiner* — Sarai E Butler
(74) *Attorney, Agent, or Firm* — Amin, Turocy & Watson, LLP

(57) ABSTRACT

A system can receive first input data indicative of first user input identifying a first diagnostic state of a computing system. The system can, based on the first input data, determine a second diagnostic state of the computing system, the second diagnostic state comprising information of the first diagnostic state. The system can present a first indication of the second diagnostic state via a user interface. The system can receive second input data indicative of second user input confirming the second diagnostic state. The system can determine a recommended action based on the second diagnostic state. The system can present a second indication of the recommended action via the user interface.

20 Claims, 9 Drawing Sheets

(56) References Cited

U.S. PATENT DOCUMENTS

| | | | |
|---|---|---|---|
| 2016/0253246 A1* | 9/2016 | Chow | G06F 11/1464 |
| | | | 714/19 |
| 2017/0270490 A1* | 9/2017 | Penilla | G07C 5/006 |
| 2020/0110123 A1* | 4/2020 | Taylor | G01R 31/68 |
| 2020/0303266 A1* | 9/2020 | Jeong | G06N 3/04 |
| 2020/0344682 A1* | 10/2020 | Kvernvik | H04W 48/18 |

* cited by examiner

300

*No Power*
No Power || ePSA Code Present
No Power || ePSA Test - Fail
No Power || ePSA Test - Pass
No Power || ePSA Test - Pass|| OSRI - Fail
No Power || ePSA Test - Pass|| Replace PSU - Pass
No Power || Full Functional Test - Fail
No Power || Full Functional Test - Fail || OSRI - Fail
No Power || MIN to power - Fail
No Power || TKG PSU - Fail
No Power || TKG PSU - Pass

FIG. 3

| | Busted PSU | Replace PSU | MIN to power | OSRI | Tried Known Good | Full Functional Test | Check logs for ePSA Code | ePSA Test |
|---|---|---|---|---|---|---|---|---|
| No Power | 17.1 | 10.9 | 16.1753 | 17.1 | 16.3899 | 18 | 11.2552 | 12.2601 |
| No Power ||| ePSA Test - Fail | 10.9 | 10.8556 | 10.8322 | 10.80217 | 10.7499 | 10.4036 | 0 | 0 |
| No Power ||| ePSA Test - Pass | 7.3472 | 0 | 0 | 10.89999 | 8.28467 | 2.29681 | 0 | 18 |
| No Power ||| Full Functional Test - Fail | 18 | 11.255 | 18 | 14.893659 | 18 | 0 | 18 | 16.764 |
| No Power ||| Full Functional Test - Fail ||| OSRI - Fail | 14.1562 | 0 | 15.9236 | 0 | 13.933 | 13.3751 | 14.5288 | 16.5733 |
| No Power ||| MIN to power - Fail | 14.6479 | 18 | 0 | 16.16846 | 15.156 | 15.3751 | 15.0631 | 14.6731 |
| No Power ||| TKG PSU - Fail | 10.1709 | 18 | 8.11707 | 15.1126 | 0 | 7.14929 | 16.7751 | 12.1823 |

GUIDANCE SYSTEM FOR COMPUTER REPAIR

BACKGROUND

Techniques can be implemented to repair computers that are malfunctioning. A system can provide a recommended repair action for a computer's particular symptoms.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. A system can receive first input data indicative of first user input identifying a first diagnostic state of a computing system. The system can, based on the first input data, determine a second diagnostic state of the computing system, the second diagnostic state comprising information of the first diagnostic state. The system can present a first indication of the second diagnostic state via a user interface. The system can receive second input data indicative of second user input confirming the second diagnostic state. The system can determine a recommended action based on the second diagnostic state. The system can present a second indication of the recommended action via the user interface.

An example method can comprise receiving, by a system comprising a processor, first input data indicative of user input identifying a first diagnostic state of a computing device. The method can further comprise, based on the first input data, determining, by the system, a second diagnostic state of the computing device, the second diagnostic state comprising the first diagnostic state. The method can further comprise facilitating, by the system, presenting a first indication of the second diagnostic state in a user interface. The method can further comprise receiving, by the system, second input data indicative of user input confirming the second diagnostic state. The method can further comprise facilitating, by the system, presenting a second indication of a recommended action in the user interface, the recommended action being determined based on the second diagnostic state.

An example non-transitory computer-readable medium can comprise instructions that, in response to execution, cause a system comprising a processor to perform operations. These operations can comprise receiving first input data indicative of user input identifying a first diagnostic state of a computing device. The operations can further comprise presenting a first indication of a second diagnostic state of the computing device via a user interface, the second diagnostic state encompassing the first diagnostic state. The operations can further comprise receiving second input data indicative of user input confirming the second diagnostic state. The operations can further comprise presenting a second indication of a recommended action via the user interface, the recommended action being determined based on the second diagnostic state.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates an example user interface that can facilitate a guidance system for computer repair, in accordance with an embodiment of this disclosure;

FIG. 4 illustrates an example interactive augmented Q-Table (IAQ-Table) that can facilitate a guidance system for computer repair, in accordance with an embodiment of this disclosure;

DETAILED DESCRIPTION

Overview

Figure 1:
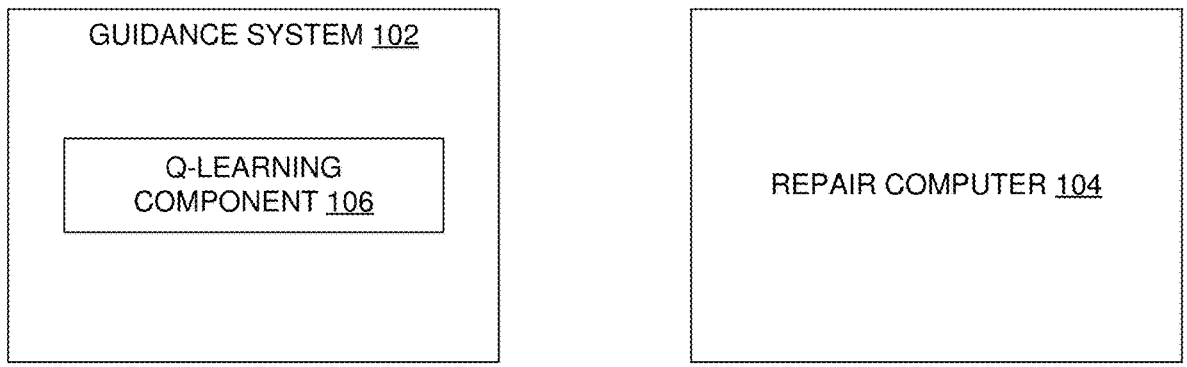
FIG. 1 illustrates an example system architecture that can facilitate a guidance system for computer repair, in accordance with an embodiment of this disclosure.

The present techniques can be used to implement a guidance system for enhancing data quality collections of actions taken to repair a computing system, and recommending corresponding repair actions. A guidance system according to these techniques can comprise a validated data enhancer (VDE) and an IAQ-Table.

Some computer hardware manufacturers and service centers can provide repair services for that hardware, and it can be valuable to ensure that repairs are done accurately and quickly. Locations where computer hardware repair services are provided can be referred to as repair depots. There are techniques for diagnostics and repair recommendations that can be used at repair depots. There can also be stored records of diagnostic and repair actions taken on prior repairs, along with a corresponding outcome of those actions, such as diagnostic test results and repair validations.

The present techniques can reduce unfavorable outcomes of repair depot performance. A metric used to measure operational excellence can be no-fault-found rate (NFF), which measures the rate at which parts or components are tested at repair facilities but do not have any functional failures found. In some environments, average NFF rates across all components in repair facilities can be 5-7%, with some components reaching NFF rates as high as 30%.

Another metric used to measure operational efficiency can be turn-around time. A typical turn-around time in a repair depot can be 10-15 minutes, and a 50-67% decrease in turn-around time can proportionally increase operational efficiency by 2-3×.

According to the present techniques, data collection quality and machine learning performance can be drivers for improving operational efficiency at a repair depot.

When a repair technician diagnoses and repairs a computer system, an expert triage system works with data supplied by the technician, and uses this data to make repair action recommendations. However, in this approach of manually entering data, it can be that the technician omits important data, such as details regarding a system's symptoms, results from diagnostics performed before the system entered the repair depot, results from the technician's own diagnostic and repair actions, or information from previous repair attempts within the depot.

Approaches according to these techniques can lack an ability to suggest information that is likely to be missing from the technician's input, which—when present, more completely describes a current state of known information about the system.

Then, it can be important to maintain a technician's interest in interacting with an expert triage system, so that the technician continues to provide data to the system, which the system can use to continue to improve. Earlier triage systems can provide a technician with a limited set of recommended actions, which can indicate to the technician that the system has only considered a narrow range of next-possible-actions. Technicians can be more likely to trust a system that is transparent, permitting a technician to see possible alternative paths forward evaluated by the expert triage system, along with an expected payout of each path.

When a repair technician enters information regarding a system's diagnostic state into an expert triage system, the information is based on the technician's recollection of interacting with the system, the technician's prior knowledge of the system, and the technician's level of motivation to enter as much relevant information as possible. A single forgotten piece of information can result in the expert triage system recommending additional wasteful diagnostics, or even incorrect repair actions.

When a validated data enhancer presents the technician with more information-rich scenarios, the technician may better match the present situation with a past situation, and therefore, lead to better recommendations from the interactive augmented Q-table.

There can be a lack of transparency in expected payoffs for alternatives evaluated by an expert triage system. A repair technician can disagree with recommendations from an expert triage system based on his or her own experience with similar cases. Suppose that the repair technician desires to perform an alternate action. While it can be likely that the expert triage system has considered and ruled out the desired action, the expert triage system can lack an ability to convey the expected payouts of alternate actions, leaving the repair technician to wonder whether his or her preferred next-action was ever considered by the expert triage system.

An interactive augmented Q-table can contain expected payouts for both recommended actions, and likely alternate actions. In the above scenario, the technician will likely see that an expected payout of his or her desired action is lower than the expert triage system's recommended action, giving feedback to the technician that his or her proposed path forward was considered against other alternatives, and judged as a suboptimal action.

A guidance system can augment a deployed expert triage system. A guidance system can comprise a technician-facing interactive display where, in a single click, a technician can select a more informative diagnostic state relative to a state that is currently indicated by an expert triage system. Once the technician has selected the information-enriched state, the technician can be shown an interactive tabular display, which can be referred to as a Q-table, and which can highlight a next-best-action as well as viable alternate paths in a repair process. This table can display expected payouts of various paths forward, giving the technician more transparency into the guidance system's considerations.

The following is an example of how a VDE and an IAQ-Table can build better data collections, and ultimately intelligent recommendations, for repair solutions. In some examples, these approaches can be applied more broadly to diagnostic and repair process, where there exists a historical record of symptoms, actions tried during diagnosis and repair, and the results of these diagnostics and repair actions.

Take an example of a system with a "no power" symptom. Suppose that a technician interacting with a comprehensive guidance system (CGS) is inputting that the system has a symptom of "no power" so that the technician can get a recommendation on a next-best-action. The technician can submit this symptom into the CGS, and the VDE can respond with a list of similar states.

In this scenario, the technician can realize there was an ePSA code present in the logs, and that the technician did not enter that information in, but otherwise, the technician has not run any other diagnostics or performed any repairs yet. The technician can then select "No Power||ePSA Test—Fail," and this information enriched state can be recorded into the CGS.

Then, the IAQ-Table can be presented to the technician, as shown in FIG. 4, where a row corresponding to the diagnostic state of the system can be highlighted, and an action with a highest expected payout can also be highlighted. For example, perhaps the technician was inclined to replace the power supply unit (PSU) immediately, yet, the technician can clearly see that "reseat PSU" has a higher Q-value. This can intuitively make sense, where addressing a bad contact has a lower NFF rate than replacing a PSU.

Where the technician selects "reseat PSU," and the power issue is still not resolved, then the state can be updated to "No Power||ePSA Test—Fail||Reseat-PSU-fail." Here, the next best action can be trying a known good power supply. A result of this action can also be updated, with a result of this diagnostic, and subsequent actions and results can be recoded until the system is repaired.

Where the technician desires to challenge the CGS and take an action other than Reseat PSU, the technician can select another action, acknowledging that the technician accepts a risk of taking an action that is likely suboptimal. The CGS records and learns from actions and outcomes, regardless of whether or not the technician follows the suggested action.

Example Architectures

FIG. 1 illustrates an example system architecture 100 that can facilitate a guidance system for computer repair, in accordance with an embodiment of this disclosure. As depicted, system architecture 100 comprises guidance system 102 and repair computer 104. In turn, guidance system 102 comprises Q-learning component 106.

Figure 9:
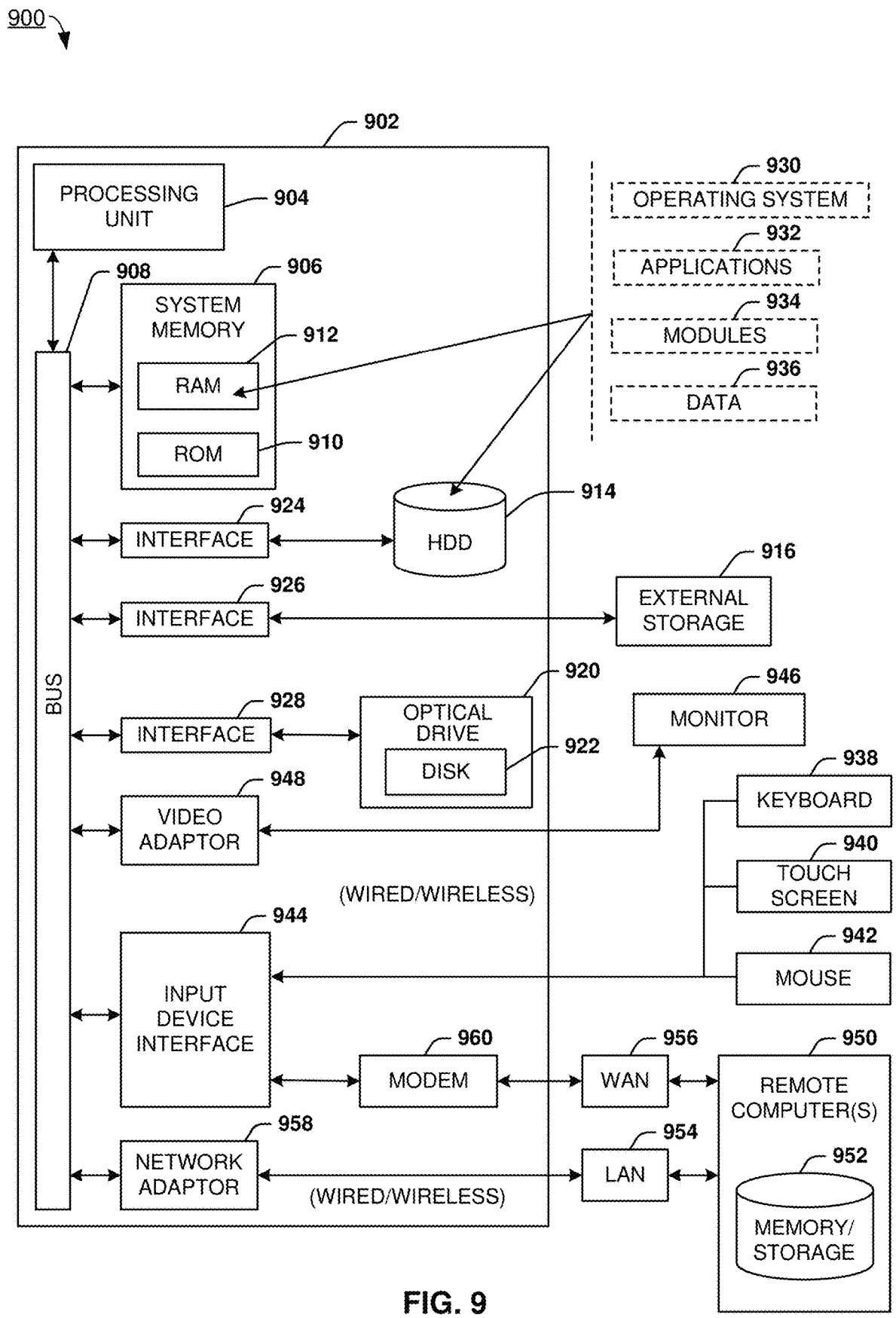
FIG. 9 illustrates an example block diagram of a computer operable to execute an embodiment of this disclosure.

In some examples, guidance system 102 and/or repair computer 104 can be implemented with part(s) of computing environment 900 of FIG. 9.

Repair computer 104 can comprise a computer that is to be repaired, such as because it will not power on, or it cannot connect to a network.

Guidance system 102 can comprise a computer system that provides recommendations of repair actions to repair computer 104. Guidance system 102 can receive input data of a diagnostic state of repair computer 104 that is input by a repair technician, and from that information, determine one or more repair actions to recommend, and display those recommended repair actions in a user interface. For example, where the diagnostic state is that repair computer 104 will not power on, a recommended repair action can comprise replacing a power supply of repair computer 104.

Guidance system 102 can also determine possible enhanced states for repair computer 104 based on the input data representing the diagnostic state. For example, if the input data is for "no power," guidance system 102 can determine possible enhanced states of "no power||ePSA Test—Pass" and "no power||ePSA Test—Fail," and can display these as options. In response to additional input data from a technician regarding which of these enhanced states is correct, guidance system 102 can produce one or more recommended repair actions and present them. As repair actions are performed and diagnostic states are input into the guidance system, iterations of this approach can be implemented in the course of repairing repair computer 104.

Q-learning component 106 can aid in implementing a guidance system for computer repair. Q-learning component 106 can implement a Q-learning technique that can compute expected payouts of diagnostic and repair actions. In some examples, this can be implemented with a tabular Q-learning technique on historical data for learning Q-values that populate cells of an IAQ-table.

Figure 5:
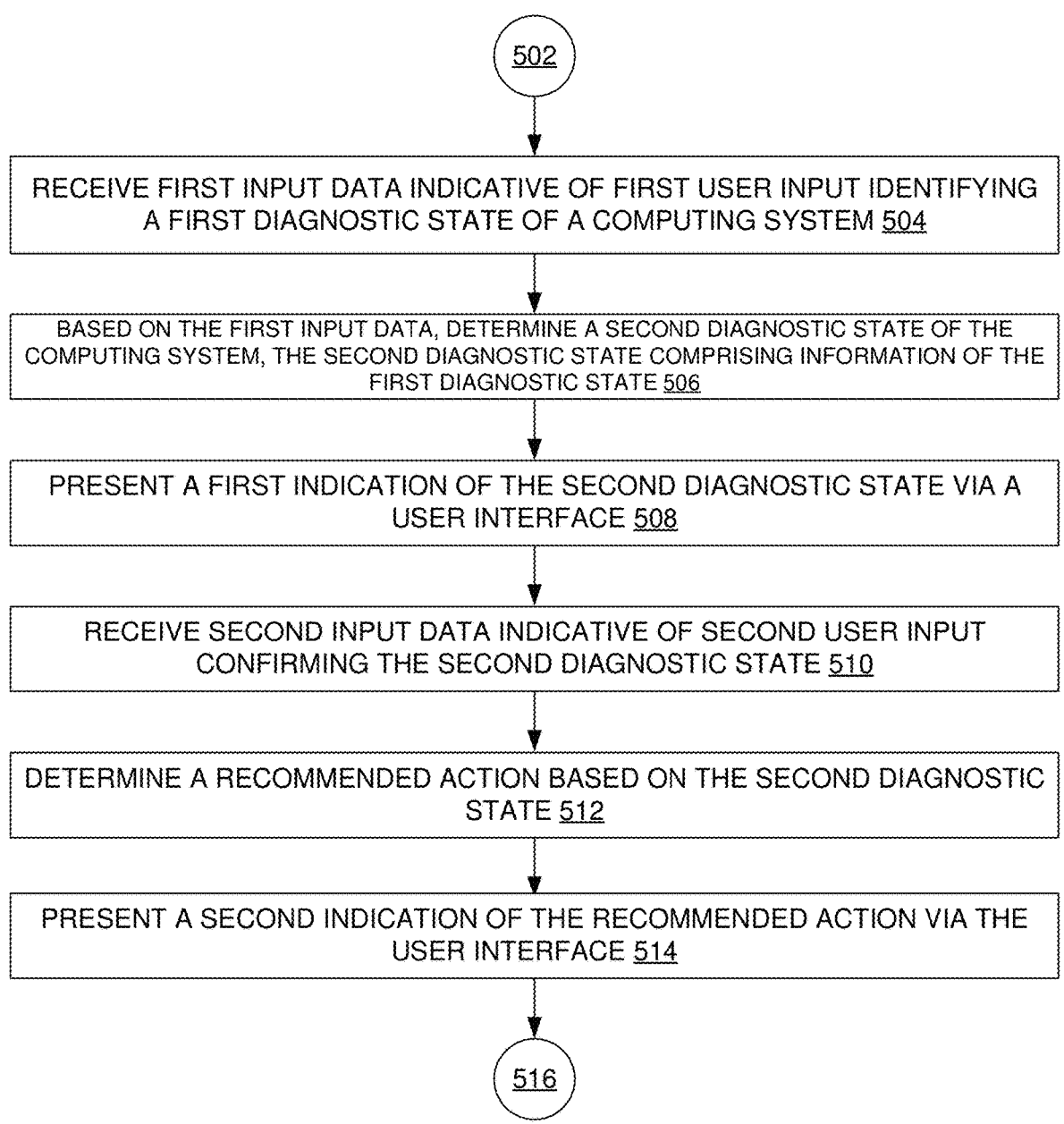
FIG. 5 illustrates an example process flow that can facilitate a guidance system for computer repair, in accordance with an embodiment of this disclosure.
Figure 6:
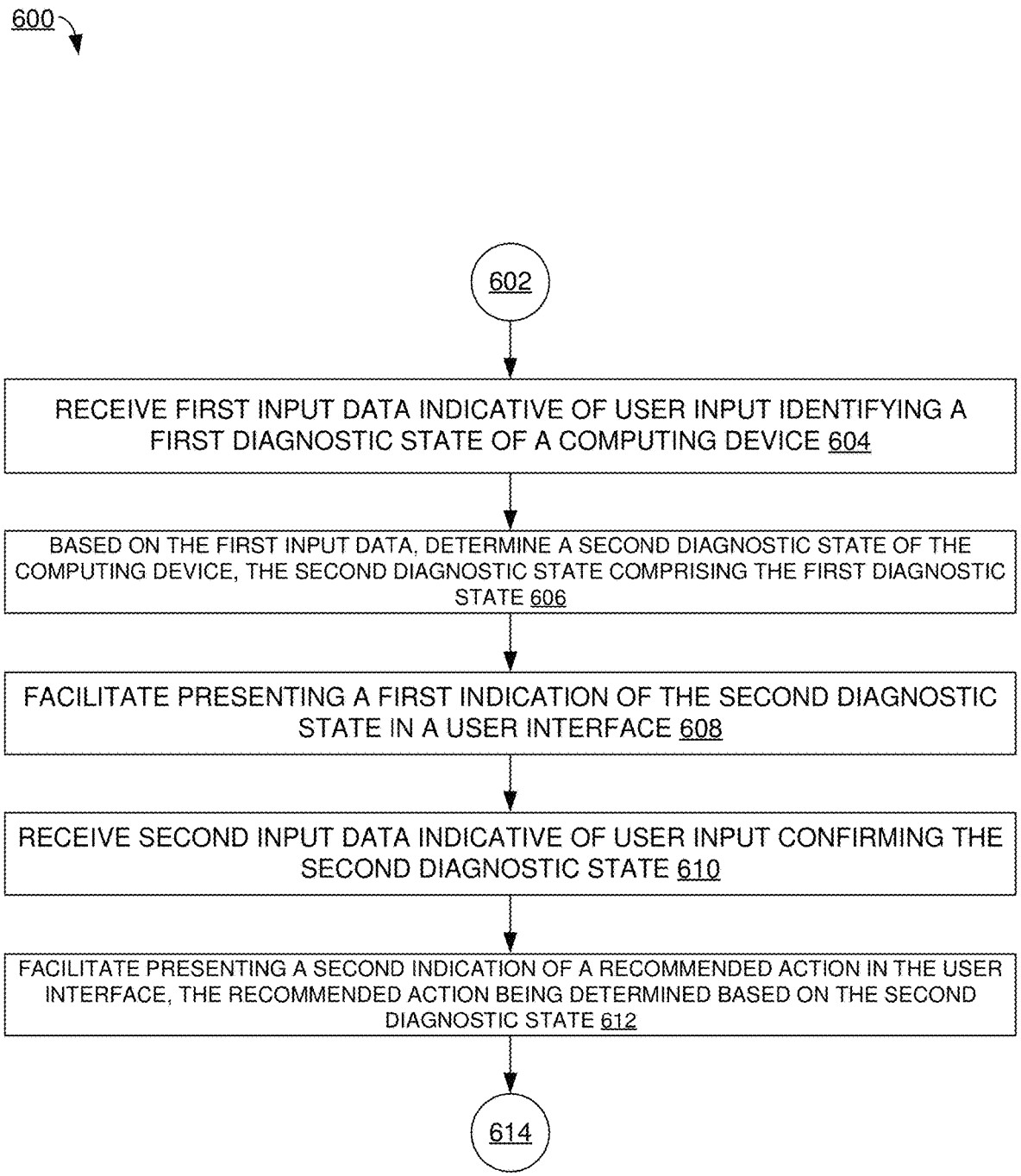
FIG. 6 illustrates another example process flow that can facilitate a guidance system for computer repair, in accordance with an embodiment of this disclosure.
Figure 7:
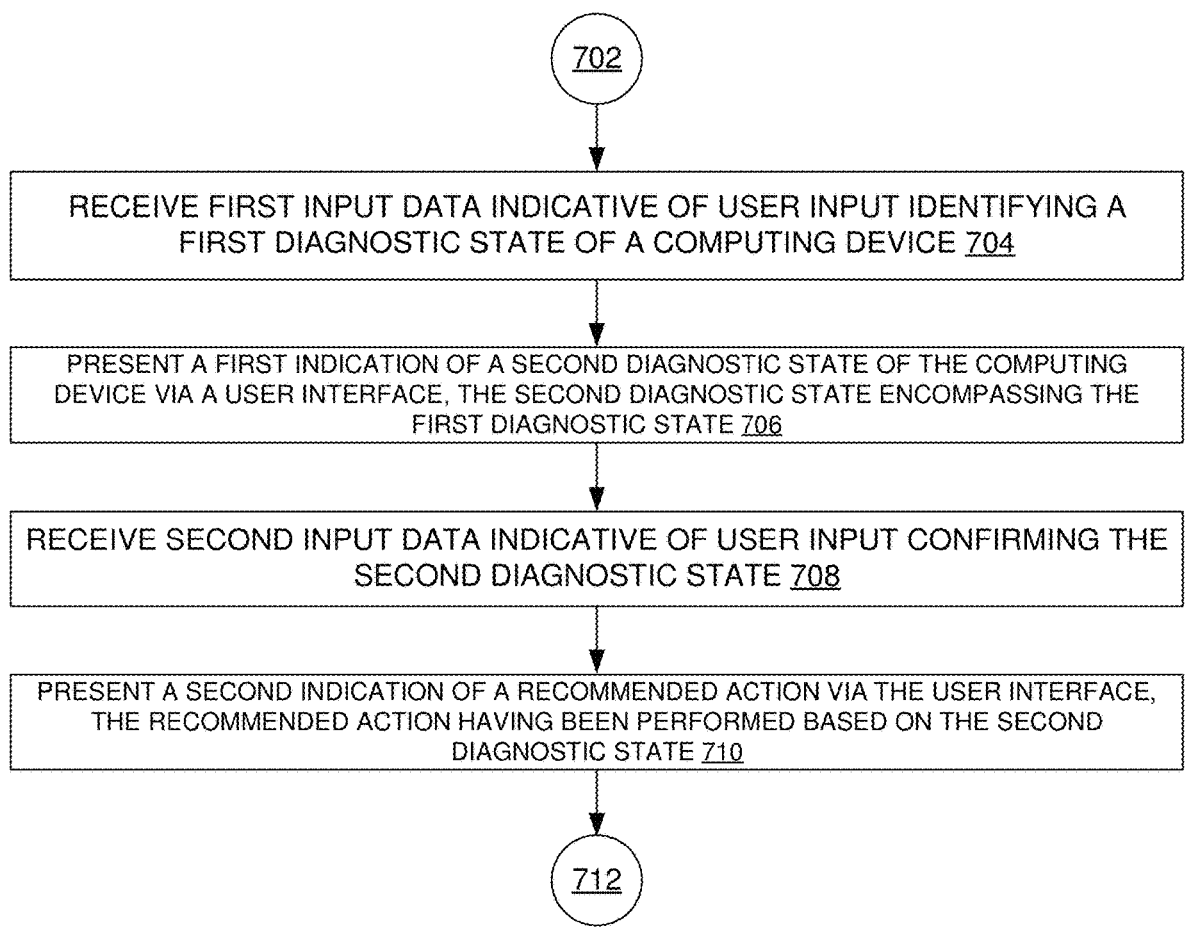
FIG. 7 illustrates another example process flow that can facilitate a guidance system for computer repair, in accordance with an embodiment of this disclosure.
Figure 8:
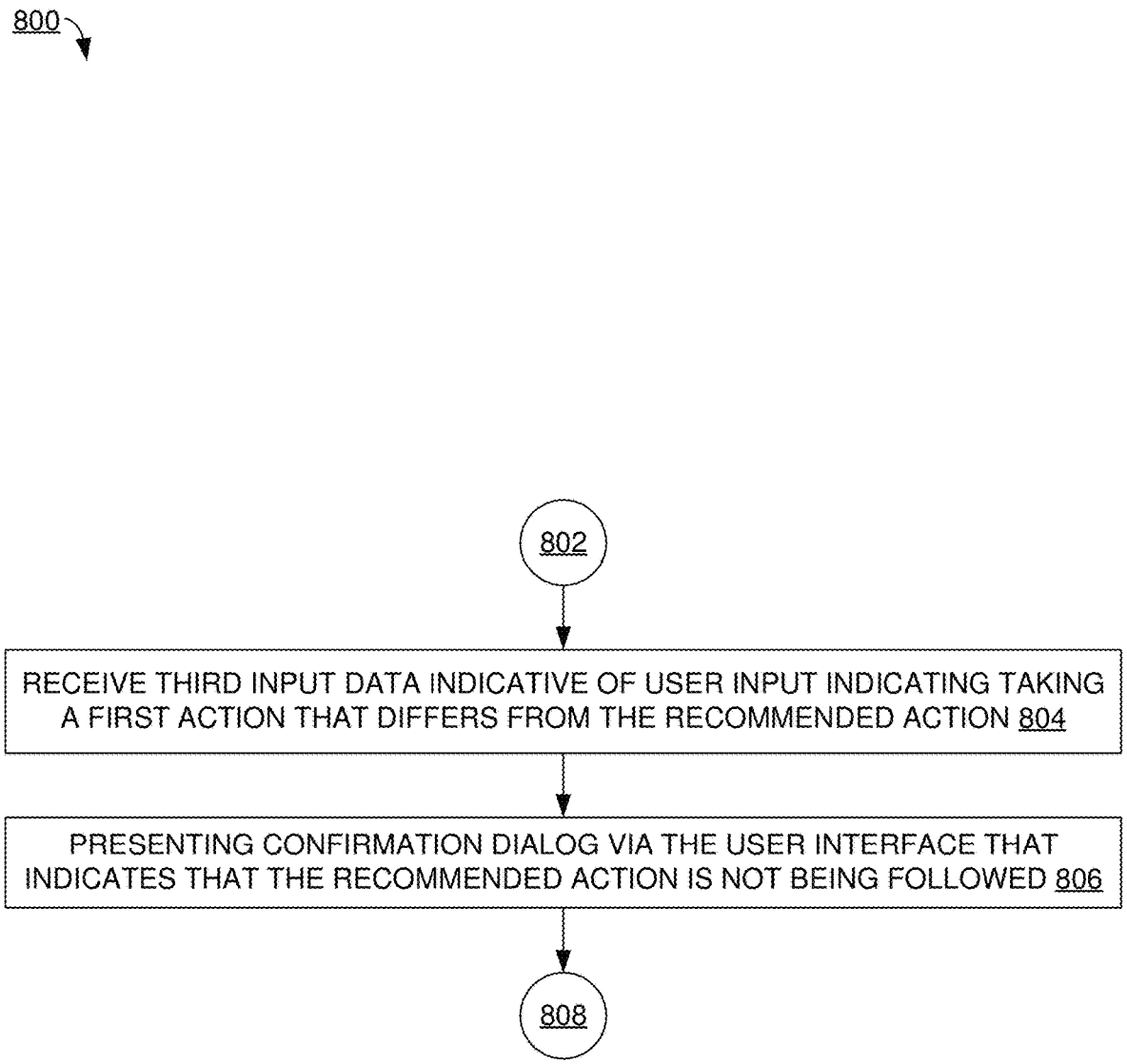
FIG. 8 illustrates an example process flow for overriding a recommendation that can facilitate a guidance system for computer repair, in accordance with an embodiment of this disclosure.

In the course of facilitating a guidance system for computer repair, guidance system 102 can implement part(s) of process flow 500 of FIG. 5, process flow 600 of FIG. 6, process flow 700 of FIG. 7, and/or process flow 800 of FIG. 8.

In the course of facilitating computer update performance assessment guidance system 102 can implement part(s) of user interface 300 and/or IAQ-Table 400.

Figure 2:
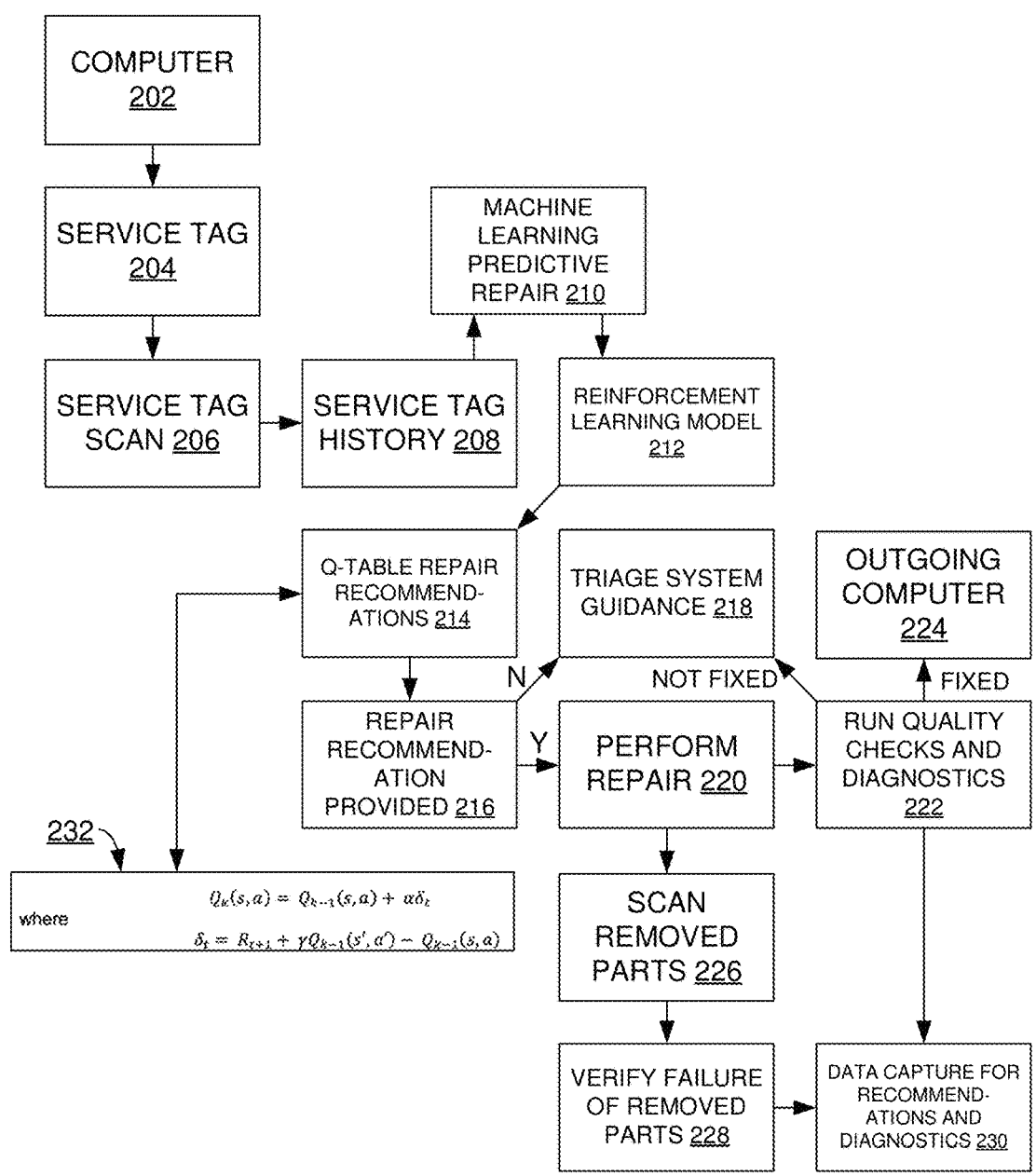
FIG. 2 illustrates another example system architecture that can facilitate a guidance system for computer repair, in accordance with an embodiment of this disclosure.

FIG. 2 illustrates another example system architecture 200 that can facilitate a guidance system for computer repair, in accordance with an embodiment of this disclosure. In some examples, part(s) of system architecture can be implemented with instances of computing environment 900 of FIG. 9.

In general, system architecture 200 can highlight how an IAQ-table can be implemented with a triage system, and overlay the technology onto a repair workflow. Given the diagnostic state of a computer to be repaired, an IAQ-table will provide a recommended action, a respective expected payout of this action and alternative actions, and a capability to select a new action, while explicitly collecting acknowledgment that a payout of a different selected alternative action is lower than the optimal one. Prior to receiving this recommended action, an information enriched diagnostic state can be selected that is similar to the state that has been input. This can provide system architecture 200 with more informative data collections and reduce a burden to explicitly enter every diagnostic test/result and repair action performed.

System architecture 200 comprises incoming computer 202, service tag 204, service tag scan 206, service tag history 208, machine learning predictive repair 210, reinforcement learning model 212, Q-table repair recommendations 214, repair recommendation provided 216, triage system guidance 218, perform repair 220, run quality checks and diagnostics 222, outgoing computer 224, scan removed parts 226, verify failure of removed parts 228, and data capture for recommendations and diagnostics 230.

Computer 202 can be malfunctioning and in need of repair. A service tag 204 (such as a bar code) can be affixed to computer 202, and this service tag 204 can be scanned at service tag scan 206 (such as by a bar code scanner).

Based on identifying computer 202 by scanning service tag 204, an application programming interface (API) call can be made by a scanner in service tag scan 206 to service tag history 208. Service tag history 208 can comprise a database that stores information related to computer 202, and uses service tag 204 as a key. This information can comprise a repair history of computer 202, symptoms currently exhibited by computer 202, and latest diagnostics of computer 202.

Information from service tag history 208 can be provided to train machine learning predictive repair 210, which can be trained to produce an output of a predicted repair action (e.g., replace a power supply) for computer 202.

Reinforcement learning model 212 can receive information from service tag history 208, machine learning predictive repair 210, and triage system guidance 218 to determine multiple possible repair actions to take, along with a likelihood of success of each repair action. This information can be manifested in Q-table repair recommendations 214, which itself can be presented in a user interface of repair recommendation provided 216 (which can include both a recommended repair, as well as Q-table alternative recommendations).

Where a technician provides input data indicative of disagreeing with repair recommendation provided 216, this information can be sent to triage system guidance 218, which can provide that information to reinforcement learning model 212 (and a different recommendation can be made or highlighted).

Where a technician provides input data indicative of agreeing with this repair recommendation provided 216, the indicated repair can be performed at perform repair 220.

Based on the indicated repair being performed, run quality checks and diagnostics 222 can be performed to determine whether the repair fixed the computer. This information can be sent to reinforcement learning model 212, triage system guidance 218 (where it is determined that the repair was not successful, is not fixed), and data capture for recommendations and diagnostics 230, which can comprise a database that stores information about the success of various repair actions taken regarding respective diagnostic states.

Additionally, based on the indicated repair being performed, any parts removed from computer 202 can be identified in scan removed parts 226. Whether those removed parts had failed can be verified in verify failure of removed parts 228, and this information can be provided to data capture for recommendations and diagnostics 230.

Where a repair is performed at 220, and running quality checks and diagnostics indicates that the system is fixed at 222, a result can be outgoing computer 224, which can be a repaired version of incoming computer 202.

Q-table repair recommendations 214 can utilize component 232 to make repair recommendations. Component 232 can implement a Q-learning technique that can compute expected payouts of diagnostic and repair actions. In some examples, this can be implemented with a tabular Q-learning technique on historical data for learning Q-values that populate cells of a Q-table. A learning rule for tabular Q-learning in component 232 can be:

$$Q_k(s,a) = Q_{k-1}(s,a) + \alpha \delta_t$$

where $$\delta_t = R_{t+1} + \gamma Q_{k-1}(s',a') - Q_{k-1}(s,a)$$

In this example,

Timestamp t can comprise an index that tracks the diagnostic state of a system over time. t=0 aligns with the description of a symptom exhibited by the system, and future times t>0 align with the repair and diagnostic actions taken.

s can comprise a diagnostic state of the system at timestep t. This diagnostic state can include symptoms exhibited by the system and actions (diagnostic and repair actions) taken by the technician up to and including timestep t.

a can comprise a diagnostic/repair action performed at timestep t.

s' and a' can comprise a respective state and action at timestep t+1.

k can comprise an update rule iteration index.

$Q_k(s,a)$ can comprise an expected future payout for performing diagnostic/repair action a for a system in diagnostic state s. Further, this can represent an estimation of an expected future payout at update rule index k.

γ can comprise a discount factor belonging to closed sub-interval of real numbers from 0 to 1, where γ=0.95 can be used in some example implementations, as values closer to 1 can emphasize an importance of long-term return more so than values closer to 0.

$R_{t+1}$ can comprise a reward received by an agent at time t+1. In some examples, the reward can comprise a sum of the following terms:

step_penalty=−0.1. This can comprise a timestep penalty used to encourage quick resolutions.

successful_action=1. This can indicate that, if the action lead to a failed diagnostic or a successfully repair, an reward contribution of 1 is granted, and otherwise, the contribution is zero.

repair_finished=10. Where the system passes a final diagnostic test confirming it has been repaired successfully, the reward contribution can be 10. Otherwise, the contribution can be zero. Where the test fails, then this result can be recorded as no fault found.

$\delta_t$ can represent a "surprise" or difference in expected future return given the knowledge of the reward $R_{t+1}$ received at time t+1.

In some examples, training can be performed with historical collections of guidance system data with an epsilon-greedy action strategy with epsilon initially set to 0.5, then decayed by a multiplier of 0.9992 at each timestep. In some examples (such as those with smaller datasets for training), Q-learning can be supplemented with offline planning techniques such as prioritized experience replay; a decision-time planning technique such as a Monte Carlo tree search; and/or sample-efficient learning (but delayed) update rules such as n-step learning or Q-lambda. A Q-Table can also comprise an action selection module. In some examples, an action selection module can implement a greedy approach, where, given a selected state by a technician, an action with a highest Q-value is selected. This approach can be defined by setting $a=\mathrm{argmax}_b Q_{k-1}(s,b)$ when selecting a future action given the state.

A Q-Table can also comprise a search module that retrieves viable actions, including both diagnostic and repair actions, which can be performed given a state. Using (q=query, k=key, v=value) notation, q and k can be the diagnostic state of the system, and v can be a list of viable actions. An output of the search module can both feed the Q-learning algorithm and populate the column labels of the Q-table.

A Q-Table can also comprise a database table that contains a current diagnostic state of the system as keys, and a list of viable actions as values. This IAQ-Table can be queried by the search module.

Example User Interfaces

FIG. 3 illustrates an example user interface 300 that can facilitate a guidance system for computer repair, in accordance with an embodiment of this disclosure. In some examples, user interface 300 can be implemented by guidance system 102 of FIG. 1 or system architecture 200 of FIG. 2.

As a technician diagnoses a system, the technician can record the symptoms exhibited by the system, and the diagnostic/repair steps he or she has taken while working on the system. However, this manual approach can lead to situations where a technician omits important steps or information about the system. A VDE component can fill in gaps left behind by a technician. In contrast to prior data imputation techniques, this newly selected additional data can be validated by the technician before the CGS stores it.

A VDE can comprise an interactive user interface (UI) that includes user interface 300. As depicted user interface 300 comprises an interactive drop-down list of likely similar states based on the technician's input of the diagnostic state of a system. This approach can permit a technician to quickly update his or her entry with the likely missing information.

A VDE can comprise an interactive user interface (such as user interface 300) that allows the technician to view states similar to the input state entered by the technician, and to select the state that most informatively describes the current diagnostic state of the system.

A VDE can also comprise a search module that takes the current diagnostic state as an input and retrieves similar diagnostic states. Using a (q=query, k=key, v=value) notation (which can be similar to a notation used in information extraction theory), q and k can comprise diagnostic states of the system, and v can comprise a list of all similar states. In some examples, in a database table, a state s' can be similar to s where both s' contains all information within s, and s' does not equal s. s' can be referred to as an information enriched state relative to a given state s. A database table that contains viable diagnostic states as keys, and information enriched states as values that can be queried by the search model.

FIG. 4 illustrates an example IAQ-Table 400 that can facilitate a guidance system for computer repair, in accordance with an embodiment of this disclosure. In some examples, IAQ-Table 400 can be implemented by guidance system 102 of FIG. 1 or system architecture 200 of FIG. 2.

In some examples, the technician can use a VDE to select the most information-enriched state that accurately represents the current diagnostic state of the system, and then the technician can be presented with an interactive augmented Q-table in IAQ-Table 400. The technician can use this table to compare the expected payouts of the next-best-action along with alternative actions, and select the action that the technician will be performing.

An IAQ-Table can have a highlighted row representing the selected diagnostic state, along with rows containing similar diagnostic states for reference. The columns can contain the viable next-actions for states within the viewing window. The table can then be augmented to visually highlight the diagnostic state selected by the technician, as well as the recommended action.

In some examples, highlighting can be implemented as follows. A shaded highlighting can be applied to a row corresponding to a state selected by the technician. Columns can represent viable actions to perform given the highlighted state, and the columns can be sorted in descending order of expected payout from left to right. An action with a highest expected payout can be highlighted.

Example Process Flows

FIG. 5 illustrates an example process flow 500 that can facilitate a guidance system for computer repair, in accordance with an embodiment of this disclosure. In some examples, one or more embodiments of process flow 500 can be implemented by guidance system 102 of FIG. 1, or computing environment 900 of FIG. 9.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flows: process flow 600 of FIG. 6, process flow 700 of FIG. 7, and/or process flow 800 of FIG. 8.

Process flow 500 begins with 502, and moves to operation 504. Operation 504 depicts receiving first input data indicative of first user input identifying a first diagnostic state of a computing system. That is, a technician using a guidance system can provide input data that indicates the state of a computer being repaired. After operation 504, process flow 500 moves to operation 506.

Operation 506 depicts, based on the first input data, determining a second diagnostic state of the computing system, the second diagnostic state comprising information of the first diagnostic state. That is, the guidance system can determine a possible enhanced state (e.g., where "no power" is input, then it can be determined that this could be "no power||ePSA code present"). After operation 506, process flow 500 moves to operation 508.

Operation 508 depicts presenting a first indication of the second diagnostic state via a user interface. That is, this determined enhanced state from operation 506 can be presented in a user interface to the technician. After operation 508, process flow 500 moves to operation 510.

Operation 510 depicts receiving second input data indicative of second user input confirming the second diagnostic state. That is, input data can be received that indicates that the technician confirms that this enhanced state is correct. After operation 510, process flow 500 moves to operation 512.

Operation 512 depicts determining a recommended action based on the second diagnostic state. That is, an action to take to repair the computer can be determined based on determining that the computer is in this enhanced state. After operation 512, process flow 500 moves to operation 514.

Operation 514 depicts presenting a second indication of the recommended action via the user interface. That is, the action to take to repair the computer can be presented in a user interface to the technician.

In some examples, operation 514 comprises presenting a group of recommended actions that comprises the recommended action. That is, for one diagnostic state, multiple possible actions to take can be presented in a user interface.

In some examples, respective recommended actions of the group of recommended actions comprise respective indications of respective probabilities of fixing a symptom associated with the second diagnostic state following actions that maximize a sum of future rewards. That is, along with a possible action, a likelihood that taking the action will lead to fixing the computer can be shown.

In some examples, the respective probabilities of fixing the symptom associated with the second diagnostic state following the actions that maximize the sum of future rewards comprises respective sums of future rewards of paths that follow taking the respective recommended actions. That is, this can be a likelihood that taking the action will lead to fixing the computer that can be shown.

In some examples, operation 514 comprises presenting a visual indication that highlights a highest ranked recommended action of the plurality of recommended actions having a highest probability of fixing the symptom associated with the second diagnostic state such that a sum of future rewards is maximized That is, where multiple possible actions are shown in a user interface, a recommended action of these actions can be highlighted, such as with a visual cue.

In some examples, operation 514 comprises presenting a group of augmented diagnostic states that comprises the second diagnostic state, each augmented diagnostic state of the group of augmented diagnostic states comprising information of the first diagnostic state. That is, multiple possible states can be shown based on a state that is input. For example, where the state that is input is "no power," then possible states "no power||ePSA Test—Pass" and "no power||ePSA Test—Fail" as can be displayed as options.

In some examples, operation 514 comprises, for each augmented diagnostic state of the group of augmented diagnostic states, presenting a respective group of recommended actions. That is, multiple possible diagnostic states can be presented, and multiple possible actions can be presented for each of these multiple possible diagnostic states.

In some examples, operation 514 comprises presenting a visual indication that highlights a top recommended action of the group of recommended actions of the group of augmented diagnostic states. That is, a recommended action can be indicated (such as visually indicated) among possible actions that are presented.

After operation 514, process flow 500 moves to 516, where process flow 500 ends.

FIG. 6 illustrates another example process flow that can facilitate a guidance system for computer repair, in accordance with an embodiment of this disclosure. In some examples, one or more embodiments of process flow 600 can be implemented by guidance system 102 of FIG. 1, or computing environment 900 of FIG. 9.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flows: process flow 500 of FIG. 5, process flow 700 of FIG. 7, and/or process flow 800 of FIG. 8.

Process flow 600 begins with 602, and moves to operation 604. Operation 604 depicts receiving first input data indicative of user input identifying a first diagnostic state of a computing device. In some examples, operation 604 can be implemented in a similar manner as operation 504 of FIG. 5.

After operation 604, process flow 600 moves to operation 606.

Operation 606 depicts based on the first input data, determining a second diagnostic state of the computing device, the second diagnostic state comprising the first diagnostic state. In some examples, operation 606 can be implemented in a similar manner as operation 506 of FIG. 5.

In some examples, the second diagnostic state comprises a superset of the first diagnostic state. That is, the first diagnostic state can be determined by input data received from a technician using a guidance system. From that, the second diagnostic state can be determined, where the second diagnostic state can comprise the first diagnostic state plus additional information. For example, where the first diagnostic state is "no power," the second diagnostic state can be "no power" plus something more, such as "no power—ePSA Test—Pass" or "no power—full functional test—fail."

After operation 606, process flow 600 moves to operation 608.

Operation 608 depicts facilitating presenting a first indication of the second diagnostic state in a user interface. In some examples, operation 608 can be implemented in a similar manner as operation 508 of FIG. 5.

In some examples, operation 608 comprises facilitating presenting a third indication of a group of diagnostic states that comprises the second diagnostic state. That is, multiple possible enhanced states can be presented to a technician via a user interface of a guidance system. In some examples, the second input data is indicative of user input confirming the second diagnostic state from among the group of diagnostic states. That is, a technician can provide input data to select the second diagnostic state from the multiple possible enhanced states.

After operation 608, process flow 600 moves to operation 610.

Operation 610 depicts receiving second input data indicative of user input confirming the second diagnostic state. In some examples, operation 610 can be implemented in a similar manner as operation 510 of FIG. 5.

After operation 610, process flow 600 moves to operation 612.

Operation 612 depicts facilitating presenting a second indication of a recommended action in the user interface, the recommended action being determined based on the second diagnostic state. In some examples, operation 612 can be implemented in a similar manner as operations 512-514 of FIG. 5.

In some examples, the second indication comprises a group of recommended actions that comprises the recommended action. In some examples, the second indication of the recommended action is presented as part of an IAQ-table. In some examples, a sum of future rewards associated with taking the recommended action is presented as part of the IAQ-table. That is, the IAQ-table can show a projected reward for taking a given action.

After operation 612, process flow 600 moves to 614, where process flow 600 ends.

FIG. 7 illustrates another example process flow that can facilitate a guidance system for computer repair, in accordance with an embodiment of this disclosure. In some examples, one or more embodiments of process flow 700 can be implemented by guidance system 102 of FIG. 1, or computing environment 900 of FIG. 9.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flows: process flow 500 of FIG. 5, process flow 600 of FIG. 6, and/or process flow 800 of FIG. 8.

Process flow 700 begins with 702, and moves to operation 704. Operation 704 depicts receiving first input data indicative of user input identifying a first diagnostic state of a computing device. In some examples, operation 704 can be implemented in a similar manner as operation 504 of FIG. 5.

After operation 704, process flow 700 moves to operation 706.

Operation 706 depicts presenting a first indication of a second diagnostic state of the computing device via a user interface, the second diagnostic state encompassing the first diagnostic state. In some examples, operation 706 can be implemented in a similar manner as operations 506-508 of FIG. 5.

In some examples, the presenting of the first indication of the second diagnostic state is displayed via drop-down user interface element. That is, a user interface similar to user interface 300 of FIG. 3 can be used to present information about the second diagnostic state.

In some examples, the second diagnostic state comprises an information enriched state relative to the first diagnostic state. For example, where the first diagnostic state is "no power," the second diagnostic state can be "no power" plus something more, such as "no power—ePSA Test—Pass" or "no power—full functional test—fail."

In some examples, the second diagnostic state comprises an observed symptom of the computing device, a diagnostic action taken with regard to the computing device, a first result of taking the diagnostic action, a repair action taken with regard to the computing device, and a second result of taking the repair action. That is, a diagnostic state can comprise a state of a computer being repaired, that includes information such as this.

After operation 706, process flow 700 moves to operation 708.

Operation 708 depicts receiving second input data indicative of user input confirming the second diagnostic state. In some examples, operation 708 can be implemented in a similar manner as operation 510 of FIG. 5.

After operation 708, process flow 700 moves to operation 710.

Operation 710 depicts presenting a second indication of a recommended action via the user interface, the recommended having been performed based on the second diagnostic state. In some examples, operation 710 can be implemented in a similar manner as operations 512-514 of FIG. 5.

After operation 710, process flow 700 moves to 712, where process flow 700 ends.

FIG. 8 illustrates an example process flow for overriding a recommendation that can facilitate a guidance system for computer repair, in accordance with an embodiment of this disclosure. In some examples, one or more embodiments of process flow 800 can be implemented by guidance system 102 of FIG. 1, or computing environment 900 of FIG. 9.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flows: process flow 500 of FIG. 5, process flow 600 of FIG. 6, and/or process flow 700 of FIG. 7.

Process flow 800 begins with 802, and moves to operation 804. Operation 804 depicts receiving third input data indicative of user input indicating taking a first action that differs from the recommended action. In diagnosing and repairing a computer, a guidance system can present multiple possible actions to take next in a user interface, along with an indication of which of these actions is recommended (such as by being most likely to lead to a successful repair the fastest). In such examples, operation 804 can comprise a technician using the guidance system indicating that he or she has elected to proceed with a different action than the recommended action.

After operation 804, process flow 800 moves to operation 806.

Operation 806 depicts presenting a confirmation dialog via the user interface that indicates that the recommended action is not being followed. This confirmation dialog can comprise an alert that is cleared before further use of the guidance system can be made. Doing this can indicate to the technician that he or she should be purposeful in deviating from the recommendation, and where the deviation leads to a longer repair path, can improve trust in the recommendations made by the guidance system.

After operation 806, process flow 800 moves to 808, where process flow 800 ends.

Example Operating Environment

In order to provide additional context for various embodiments described herein, FIG. 9 and the following discussion are intended to provide a brief, general description of a suitable computing environment 900 in which the various embodiments of the embodiment described herein can be implemented.

For example, parts of computing environment 900 can be used to implement one or more embodiments of guidance system 102 or repair computer 104 of FIG. 1.

In some examples, computing environment 900 can implement one or more embodiments of the process flows of FIGS. 5-8 to facilitate a guidance system for computer repair.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a nonvolatile storage such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving first input data indicative of first user input identifying a first diagnostic state of a computing system, wherein the first diagnostic state omits an omitted part of a diagnosis of the computing system;
based on the first input data indicative of first user input identifying the first diagnostic state, determining a second diagnostic state of the computing system, wherein the second diagnostic state comprises a superset of information of the first diagnostic state and includes the omitted part of the diagnosis;
based on determining the second diagnostic state based on the first input data, presenting a first indication of the second diagnostic state via a user interface and a user interface element configured to receive second input data indicative of second user input confirming that the second diagnostic state;
receiving the second input data indicative of second user input confirming that the second diagnostic state, including the omitted part of the diagnosis, and as determined by the system, is correct;
determining a recommended action based on the second diagnostic state; and
presenting a second indication of the recommended action via the user interface.

2. The system of claim 1, wherein the presenting of the second indication of the recommended action via the user interface comprises:
presenting a group of recommended actions that comprises the recommended action.

3. The system of claim 2, wherein respective recommended actions of the group of recommended actions comprise respective indications of respective probabilities of fixing a symptom associated with the second diagnostic state following actions that maximize a sum of future rewards.

4. The system of claim 3, wherein the respective probabilities of fixing the symptom associated with the second diagnostic state following the actions that maximize the sum of future rewards comprises respective sums of future rewards of paths that follow taking the respective recommended actions.

5. The system of claim 2, further comprising:
presenting a visual indication that highlights a highest ranked recommended action of the group of recommended actions having a highest probability of fixing the symptom associated with the second diagnostic state such that a sum of future rewards is maximized.

6. The system of claim 2, wherein the operations further comprise:
presenting a group of augmented diagnostic states, wherein each augmented diagnostic state of the group of augmented diagnostic states comprises the second diagnostic state, and wherein each augmented diagnostic state of the group of augmented diagnostic states comprises information of the first diagnostic state.

7. The system of claim 6, wherein the operations further comprise:
for each augmented diagnostic state of the group of augmented diagnostic states, presenting a respective group of recommended actions.

8. The system of claim 7, wherein the operations further comprise:
presenting a visual indication that highlights a top recommended action of the group of recommended actions of the group of augmented diagnostic states.

9. The system of claim 1, wherein determining the second diagnostic state of the computing system is performed based on a Q-learning technique that determines an expected reward of a repair action based on a first value that comprises a negative value associated with performing any action, a second value that comprises a positive value associated with an action that leads to a failed diagnostic or a successful repair of the computing system at a future action, and a third value that comprises a positive value associated with an action that causes the computing system to pass a final diagnostics test.

10. A method, comprising: receiving, by a system comprising a processor, first input data indicative of user input identifying a first diagnostic state of a computing device, wherein the first diagnostic state omits an omitted part of a diagnosis of the computing device; based on the first diagnostic state, determining, by the system, a second diagnostic state of the computing device, wherein the second diagnostic state comprises the first diagnostic state and comprises the omitted part of the diagnosis; facilitating, by the system, presenting a first indication of the second diagnostic state in a user interface, based on determining the second diagnostic state based on the first input data; receiving, by the system, second input data indicative of user input confirming the second diagnostic state, including the omitted part of the diagnosis; and facilitating, by the system, presenting a second indication of a recommended action in the user interface, the recommended action being determined based on the second diagnostic state.

11. The method of claim 10, wherein the second diagnostic state comprises a superset of the first diagnostic state.

12. The method of claim 10, wherein facilitating the presenting of the first indication of the second diagnostic state in the user interface comprises:

facilitating presenting a third indication of a group of diagnostic states that comprises the second diagnostic state.

13. The method of claim 12, wherein the second input data is indicative of user input confirming the second diagnostic state from among the group of diagnostic states.

14. The method of claim 10, wherein the second indication comprises a group of recommended actions that comprises the recommended action.

15. The method of claim 10, wherein the second indication of the recommended action is presented as part of a Q-table.

16. The method of claim 15, wherein a sum of future rewards associated with taking the recommended action is presented as part of the Q-table.

17. A non-transitory computer-readable medium comprising instructions that, in response to execution, cause a system comprising a processor to perform operations, comprising: receiving first input data indicative of user input identifying a first diagnostic state of a computing device, wherein the first diagnostic state omits an omitted part of a diagnosis of the computing device; based on determining a second diagnostic state based on the first input data, presenting a first indication of the second diagnostic state of the computing device via a user interface, wherein the second diagnostic state enhances the first diagnostic state with additional information about the first diagnostic state relative to the first diagnostic state; receiving second input data indicative of user input confirming the second diagnostic state, including the omitted part of the diagnosis; and presenting a second indication of a recommended action via the user interface, the recommended action having been performed based on the second diagnostic state.

18. The non-transitory computer-readable medium of claim 17, wherein the presenting of the first indication of the second diagnostic state is displayed via drop-down user interface element.

19. The non-transitory computer-readable medium of claim 17, wherein the operations further comprise:
receiving third input data indicative of user input indicating taking a first action that differs from the recommended action; and
presenting a confirmation dialog via the user interface that indicates that the recommended action is not being followed.

20. The non-transitory computer-readable medium of claim 17, wherein the second diagnostic state comprises an observed symptom of the computing device, a diagnostic action taken with regard to the computing device, a first result of taking the diagnostic action, a repair action taken with regard to the computing device, and a second result of taking the repair action.

* * * * *